(No Model.)
J. L. NEVILLE.
STUMP EXTRACTOR.
No. 303,449. Patented Aug. 12, 1884.
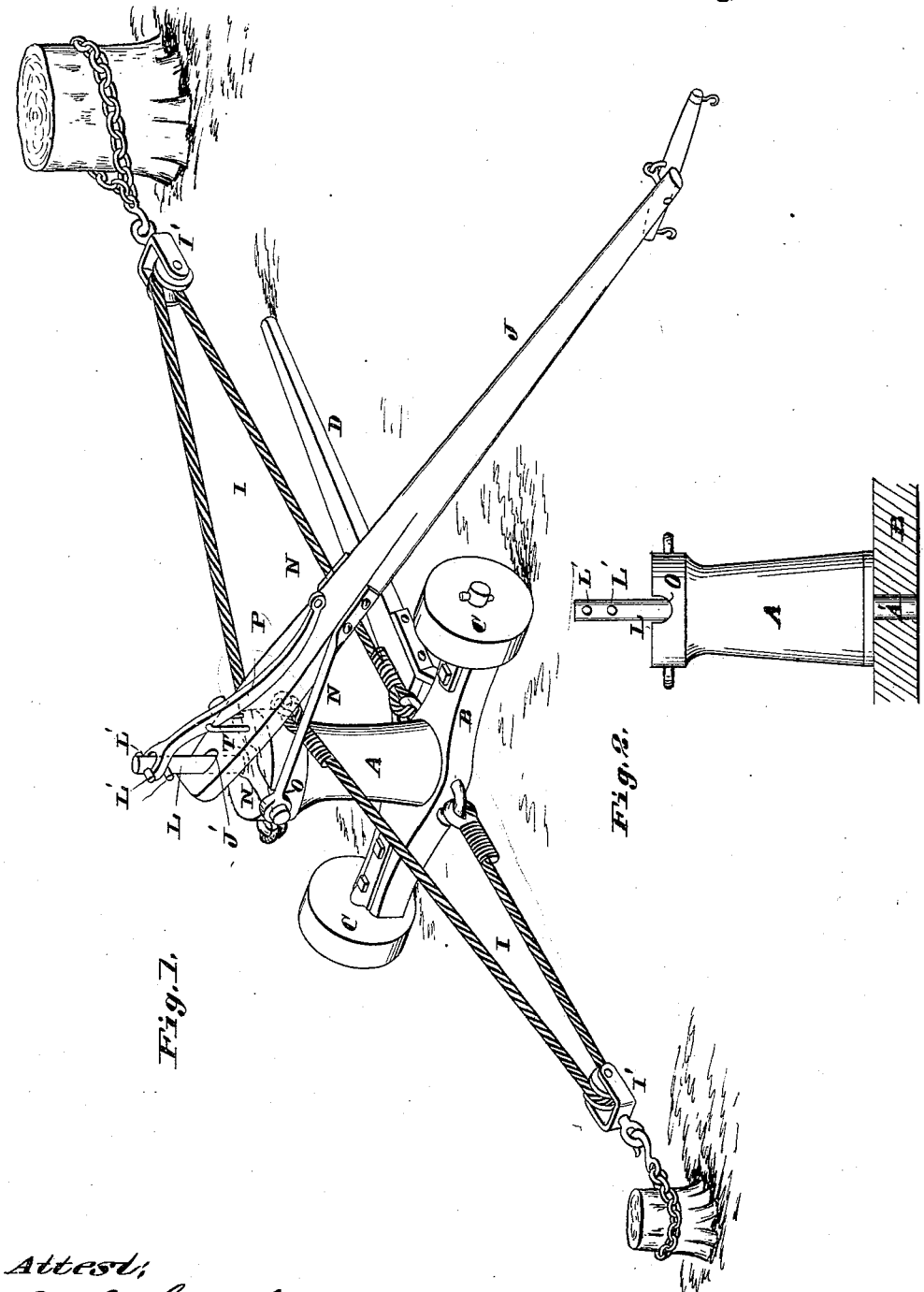
Attest:
Geo. L. Wheelock
Victor A. Lewis
Inventor,
James L. Neville
By Knight Bros
Attys

UNITED STATES PATENT OFFICE.

JAMES LILBURN NEVILLE, OF WINFIELD, MISSOURI.

STUMP-EXTRACTOR.

SPECIFICATION forming part of Letters Patent No. 303,449, dated August 12, 1884.

Application filed June 23, 1884. (No model.)

*To all whom it may concern:*

Be it known that I, JAMES L. NEVILLE, of Winfield, in the county of Lincoln and State of Missouri, have invented a certain new and useful Improvement in Stump-Extractors, of which the following is a full, clear, and exact description, reference being had to the accompanying drawings, forming part of this specification, and in which—

Figure 1 is a perspective view of the apparatus, illustrating also the manner in which it is connected to the stumps; and Fig. 2 is a side elevation of the capstan or drum.

My invention relates to an apparatus for extracting or pulling stumps; and my invention consists in features of novelty hereinafter fully described, and pointed out in the claims.

Referring to the drawings, A represents a drum or capstan, supported on an axle, B, mounted on wheels C, and provided with a tongue, D, by which the apparatus is pulled from place to place. The drum turns upon the axle, being connected to it by means of a journal, A', on its lower end, fitting in a socket in the axle, as shown in Fig. 2. Secured to the opposite sides of the axle are two ropes, I, the other ends of which are made fast to the upper part of the drum, as shown in Fig. 1. Each rope is provided with a pulley-block, I', which is made fast to the stumps, as shown. Thus when the drum is turned the upper parts of the ropes will be wound around it, as will be readily seen. The drum is turned by a lever or sweep, J, having an opening or perforation, J', to receive a post or pin, L, on top of the drum, and a cross-bar, M, which also has a perforation to receive the post. The cross-bar and lever are connected by braces N, bolted to the lever, and having sockets receiving the ends of the cross-bar. The cross-bar fits in a transverse groove, O, in the top of the drum or capstan, and thus the drum is turned with the lever. When the stump has been pulled or the ropes wound upon the drum, the lever does not have to be turned back to unwind the rope, but is disconnected from the drum by means of a short lever, P, connected to the top of the post L by pins L', or otherwise, and to the sweep by a staple, T, or equivalent device. Thus, by simply raising the free end of the lever P, the cross-bar is raised out of the groove O, and the drum is free to be turned independent of the sweep, and when the lever P is released the sweep and cross-bar will drop onto the top of the drum and the bar enter the groove O. If the groove does not happen to be opposite the bar, it is only required to turn the sweep until they coincide.

A peculiarity of my machine is that in pulling a stump it will move away from the stump, which adds to the speed of the apparatus, it being just that much quicker than a stationary drum or apparatus. If the ropes are made fast to two stumps, as shown in the drawings, the apparatus will move toward the stump that does not pull up or the one that is the firmest in the ground; but if one of the ropes is fastened to an anchor, as may be done, the apparatus would move toward the anchor.

I claim as my invention—

1. In a stump-extractor, the combination of the drum or capstan, axle, supporting-wheels, sweep, and ropes, arranged and operating substantially as shown and described.

2. In a stump-extractor, the combination of the truck, drum mounted on the truck, ropes having pulley-blocks, and secured, respectively, to the truck and drum, and the sweep removably connected to the drum, substantially as shown and described.

3. In a stump-extractor, the combination of the truck, drum mounted on the truck, ropes having pulley-blocks, and secured, respectively, to the truck and drum, and the sweep provided with a cross-bar fitting in a groove in the top of the drum, and a short lever fulcrumed to it and connected to a post on top of the drum, the post fitting in holes in the cross bar and sweep, all arranged and operating substantially as shown and described.

JAMES LILBURN NEVILLE.

In presence of—
OMER H. AVERY,
CHARLES MARTIN.